United States Patent
Yang et al.

(10) Patent No.: US 11,609,361 B2
(45) Date of Patent: *Mar. 21, 2023

(54) LENS ASSEMBLY AND PORTABLE ELECTRONIC DEVICE

(71) Applicant: SAMSUNG ELECTRO-MECHANICS CO., LTD., Suwon-si (KR)

(72) Inventors: Dong Shin Yang, Suwon-si (KR); Tae Su Choi, Suwon-si (KR); Sot Eum Seo, Suwon-si (KR); Ju Sung Park, Suwon-si (KR)

(73) Assignee: Samsung Electro-Mechanics Co., Ltd., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/841,609

(22) Filed: Jun. 15, 2022

(65) Prior Publication Data

US 2022/0308267 A1    Sep. 29, 2022

Related U.S. Application Data

(63) Continuation of application No. 17/143,628, filed on Jan. 7, 2021, now Pat. No. 11,391,868, which is a
(Continued)

(30) Foreign Application Priority Data

Aug. 14, 2018    (KR) .................. 10-2018-0095174
Nov. 15, 2018    (KR) .................. 10-2018-0140774

(51) Int. Cl.
*G02B 3/00*    (2006.01)
*G02B 7/02*    (2021.01)
(Continued)

(52) U.S. Cl.
CPC .................. *G02B 3/00* (2013.01); *G02B 7/02* (2013.01); *G02B 13/0015* (2013.01);
(Continued)

(58) Field of Classification Search
None
See application file for complete search history.

(56) References Cited

U.S. PATENT DOCUMENTS 9,341,813 B1    5/2016    Lin et al.
9,491,362 B2    11/2016   Hu et al.
(Continued)

FOREIGN PATENT DOCUMENTS

CN    101111791 A1    1/2008
CN    102109666 A     6/2011
(Continued)

OTHER PUBLICATIONS

Chinese Office Action dated Dec. 3, 2020 in counterpart Chinese Patent Application No. 201910717693.9 (4 pages in English, 8 pages in Chinese).

*Primary Examiner* — Christopher K Peterson
(74) *Attorney, Agent, or Firm* — NSIP Law

(57) ABSTRACT

A lens assembly includes a lens including an optical portion refracting light and a flange portion extending along a portion of a circumference of the optical portion, a blocking member disposed in front of the lens and having an opening to allow light to be incident on the lens, and a lens barrel accommodating the lens. The optical portion is noncircular and a portion of the blocking member facing the optical portion in an optical axis direction is located to be higher than a portion of the blocking member facing the flange portion in the optical axis direction.

17 Claims, 5 Drawing Sheets

Related U.S. Application Data continuation of application No. 16/444,005, filed on Jun. 18, 2019, now Pat. No. 10,914,869.

(51) Int. Cl.
- *G02B 13/00* (2006.01)
- *H04N 23/54* (2023.01)
- *H04N 23/55* (2023.01)
- *H04N 23/53* (2023.01)
- *H04N 23/63* (2023.01)

(52) U.S. Cl.
CPC ............. *H04N 23/54* (2023.01); *H04N 23/55* (2023.01); *H04N 23/63* (2023.01); *G02B 2003/0093* (2013.01)

(56) References Cited

U.S. PATENT DOCUMENTS

| | | | |
|---|---|---|---|
| 10,914,869 | B2 | 2/2021 | Yang et al. |
| 11,391,868 | B2 * | 7/2022 | Yang .................... H04N 5/2253 |
| 2004/0008428 | A1 | 1/2004 | Fang et al. |
| 2006/0171046 | A1 | 8/2006 | Recco et al. |
| 2011/0157430 | A1 | 6/2011 | Hosoya et al. |
| 2012/0326006 | A1 | 12/2012 | Iwatsuki |
| 2013/0021683 | A1 | 1/2013 | Yu et al. |
| 2014/0368723 | A1 | 12/2014 | Jung et al. |
| 2015/0323757 | A1 | 11/2015 | Bone |
| 2016/0134813 | A1 * | 5/2016 | Hu .................... H04N 5/23287 348/208.11 |
| 2016/0139359 | A1 | 5/2016 | Lin et al. |
| 2017/0108627 | A1 | 4/2017 | Chou et al. |
| 2017/0160511 | A1 * | 6/2017 | Kim .................... G02B 13/002 |

FOREIGN PATENT DOCUMENTS

| | | |
|---|---|---|
| CN | 102812414 A | 12/2012 |
| CN | 103620468 A | 3/2014 |
| CN | 204359995 U | 5/2015 |
| CN | 104820271 A | 8/2015 |
| CN | 105093468 A | 11/2015 |
| CN | 206892433 U | 1/2018 |
| CN | 107783243 A | 3/2018 |
| CN | 207251755 U | 4/2018 |
| CN | 207352249 U | 5/2018 |
| CN | 108363159 A | 8/2018 |
| JP | H03-155531 A | 7/1991 |
| JP | 2006-267391 A | 10/2006 |
| KR | 10-1268983 B1 | 5/2013 |

* cited by examiner

LENS ASSEMBLY AND PORTABLE ELECTRONIC DEVICE

CROSS-REFERENCE TO RELATED APPLICATIONS

This application is a Continuation Application of U.S. patent application Ser. No. 17/143,628, filed on Jan. 7, 2021, which is a Continuation Application of U.S. patent application Ser. No. 16/444,005, filed on Jun. 18, 2019, which claims the benefit under 35 USC 119(a) of Korean Patent Application Nos. 10-2018-0095174 filed on Aug. 14, 2018, and 10-2018-0140774 filed on Nov. 15, 2018, in the Korean Intellectual Property Office, the entire disclosures of which are incorporated herein by reference for all purposes.

BACKGROUND

1. Field

This application relates to a lens assembly and portable electronic device.

2. Description of the Background

In portable electronic devices such as smartphones, camera modules are being used and, recently, reductions in the size of camera modules to be mounted in portable electronic devices is also required in accordance with requirements for the miniaturization of portable electronic devices.

However, in the case in which only the size of a camera module is reduced, there may be a problem in that the performance of a camera module is deteriorated. Thus, research into reducing the size of a camera module, while maintaining or improving performance of a camera module, is required.

Lenses of camera modules are generally circular, and since image sensors of camera modules have a rectangular shape, the light refracted by lenses may not all be imaged on the image sensor.

Accordingly, a method of reducing the size of a camera module by reducing the size of a lens by removing an unnecessary portion from the lens may be considered.

However, in a case of only removing a portion of a lens, unnecessary light, for example, stray light, may be introduced into a space formed between a lens barrel and a lens, deteriorating the quality of a captured image.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a lens assembly includes a lens including an optical portion refracting light and a flange portion extending along a portion of a circumference of the optical portion, a blocking member disposed in front of the lens and having an opening to allow light to be incident on the lens, and a lens barrel accommodating the lens. The optical portion is noncircular, and a portion of the blocking member, facing the optical portion in an optical axis direction, is located to be higher than a portion of the blocking member, facing the flange portion in the optical axis direction.

The blocking member may be in contact with the flange portion and not in contact with the optical portion.

The portion of the blocking member facing the optical portion in the optical axis direction, may have an arc shape.

The optical portion may include a first edge and a second edge having an arc shape when viewed in the optical axis direction, and a third edge and a fourth edge, connecting the first edge and the second edge to each other.

The flange portion may extend from the first edge and the second edge.

Boundaries between the third and fourth edges and the blocking member may be located to be higher than boundaries between the first and second edges and the blocking member, in the optical axis direction.

Object sides of the third edge and the fourth edge may have an arc shape when viewed in a direction perpendicular to an optical axis.

A surface of the blocking member, facing the third edge and the fourth edge in the optical axis direction, may have an arc shape when viewed in the direction perpendicular to the optical axis.

The blocking member may include a first portion and a second portion opposing each other, and a third portion and a fourth portion opposing each other, and a space surrounded by the first portion to the fourth portion may form the opening, the first portion and the second portion may be located in a position corresponding to the flange portion, and the third portion and the fourth portion may be located in a position in which portions of the third and fourth portions correspond to the optical portion.

A virtual straight line, connecting a lower surface of the first portion and a lower surface of the second portion to each other at a shortest distance, while passing through an optical axis, may be located on a plane different from a plane on which a virtual straight line, connecting a lower surface of the third portion and a lower surface of the fourth portion to each other at a shortest distance, while passing through the optical axis, is located.

An object-side surface of the optical portion may be convex.

The opening may be noncircular.

A portable electronic device may include the lens assembly, an image sensor configured to convert light incident through the optical portion disposed in the lens barrel to an electrical signal, and a display unit disposed on a surface of the portable electronic device to display an image based on the electrical signal.

In another general aspect, a lens assembly includes a lens including an optical portion refracting light and a flange portion extending along a portion of a circumference of the optical portion, a blocking member disposed in front of the lens and having an opening to allow light to be incident on the lens, and a lens barrel accommodating the lens. The optical portion is noncircular, and a portion of the blocking member, facing the optical portion in an optical axis direction, has an arc shape.

The blocking member may include a first portion and a second portion in contact with the flange portion, and a third portion and a fourth portion not in contact with the optical portion and connecting the first portion and the second portion to each other.

An object-side surface of the optical portion may be convex, and at least a portion of the third portion and at least a portion of the fourth portion may be disposed to cover a portion of the optical portion in the optical axis direction.

In another general aspect, a blocking member for a lens assembly includes first opposing sides to block incident light and having lower surfaces disposed in a first plane, second opposing sides to block incident light and having lower surfaces disposed above the first plane in an optical axis direction, and an opening disposed between the first and second opposing sides to pass incident light therethrough.

The lower surfaces of the second opposing sides may have an arc shape extending in a convex or concave direction along the optical axis direction.

A portable electronic device may include the blocking member, a lens to refract the incident light and having a convex or concave portion and a planar portion of a side disposed facing the blocking member, an image sensor configured to convert light incident through the lens to an electrical signal, and a display unit disposed on a surface of the portable electronic device to display an image based on the electrical signal, wherein the lower surfaces of the first opposing sides may contact the planar portion and the lower surfaces of the second opposing sides may be spaced apart from and follow the contour of the convex or concave portion.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
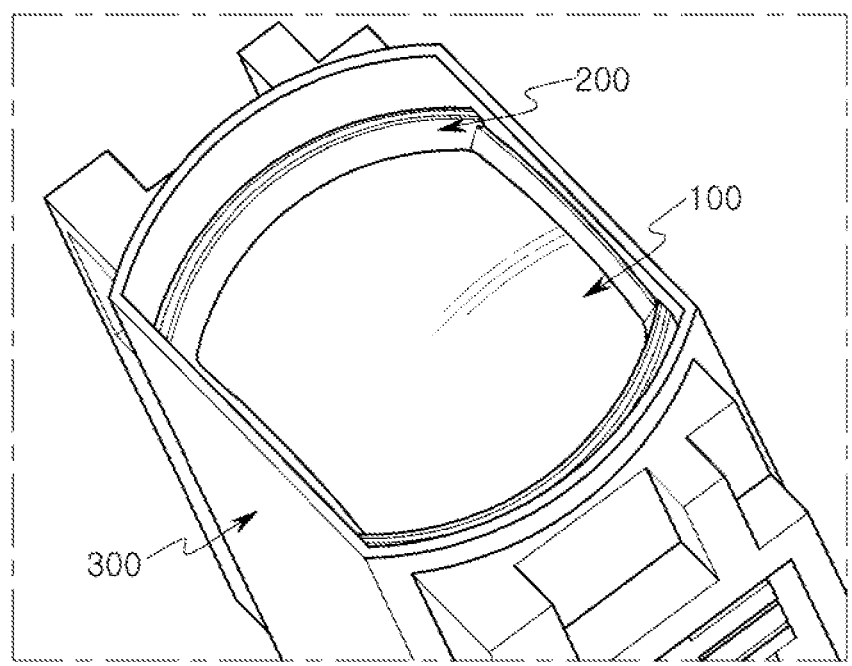
FIG. 1 is a perspective view of a lens assembly according to an example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. Hereinafter, while embodiments of the present disclosure will be described in detail with reference to the accompanying drawings, it is noted that examples are not limited to the same.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples, and similarly, the second member, component, region, layer, or section may also be referred to as a first member, component, region, layer, or section.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Herein, it is noted that use of the term "may" with respect to an example, for example, as to what an example may include or implement, means that at least one example exists in which such a feature is included or implemented while all examples are not limited thereto.

Examples are described herein of a lens assembly, in which the size of a lens assembly may be reduced while securing the performance of a lens assembly. A lens assembly according to an example may be provided in a camera module mounted on a portable electronic device.

In the examples described herein, a portable electronic device may refer to a portable electronic device such as a mobile communications terminal, a smartphone, a tablet PC, or the like.

Figure 2:
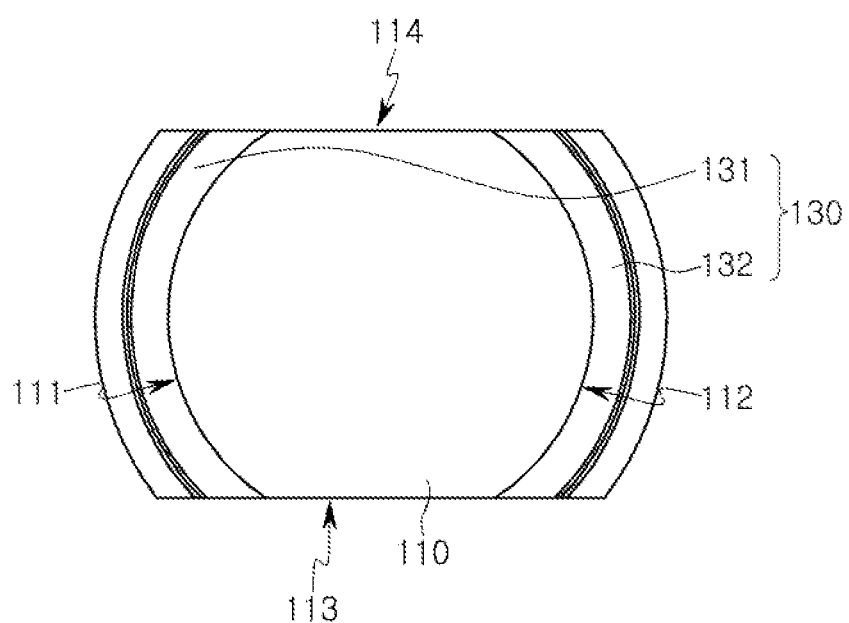
FIG. 2 is a schematic plan view of a lens according to an example.

FIG. 1 is a perspective view of a lens assembly according to an example, and FIG. 2 is a plan view of a lens according to an example.

Referring to FIGS. 1 and 2, a lens assembly according to an example includes a lens 100, a blocking member 200, and a lens barrel 300.

The lens 100 is accommodated in the lens barrel 300. For example, when a plurality of lenses are accommodated in the lens barrel 300, the plurality of lenses are disposed along an optical axis.

The lens 100 includes an optical portion 110 and a flange portion 130.

The optical portion 110 may be a portion in which optical performance of the lens 100 is exhibited. In an example, light reflected from a subject may be refracted while passing through the optical portion 110.

The optical portion 110 may have a positive or negative refractive power, and may have a spherical or aspherical shape.

The optical portion 110 includes an object-side surface OS, for example, a surface facing an object side, and an image-side surface IS, for example, a surface facing an image side. In the present example, the object-side surface is convex, and the image-side surface is concave.

The flange portion 130 may be a portion fixing the lens 100 to another structure, for example, the lens barrel 300 or another lens.

The flange portion 130 extends around a portion of the optical portion 110, and may be integrally formed with the optical portion 110.

On the other hand, the lens assembly according to an example may have characteristics of a telephoto lens having a relatively narrow angle of view. In an example, the angle of view of the lens assembly may be 40 degrees or less.

The optical portion 110 and the flange portion 130 are formed to have a noncircular shape. For example, the optical portion 110 and the flange portion 130 have a noncircular shape when viewed in an optical axis direction (see FIG. 2).

The optical portion 110 includes a first edge 111, a second edge 112, a third edge 113, and a fourth edge 114. The first edge 111 and the second edge 112 are located to oppose each other, and the third edge 113 and the fourth edge 114 are located to oppose each other. The third edge 113 and the fourth edge 114 respectively connect the first edge 111 and the second edge 112 to each other.

The first edge 111 and the second edge 112 include an arc shape, and the third edge 113 and the fourth edge 114 include a substantially linear shape, when viewed in the optical axis direction (see FIG. 2).

Figure 6:
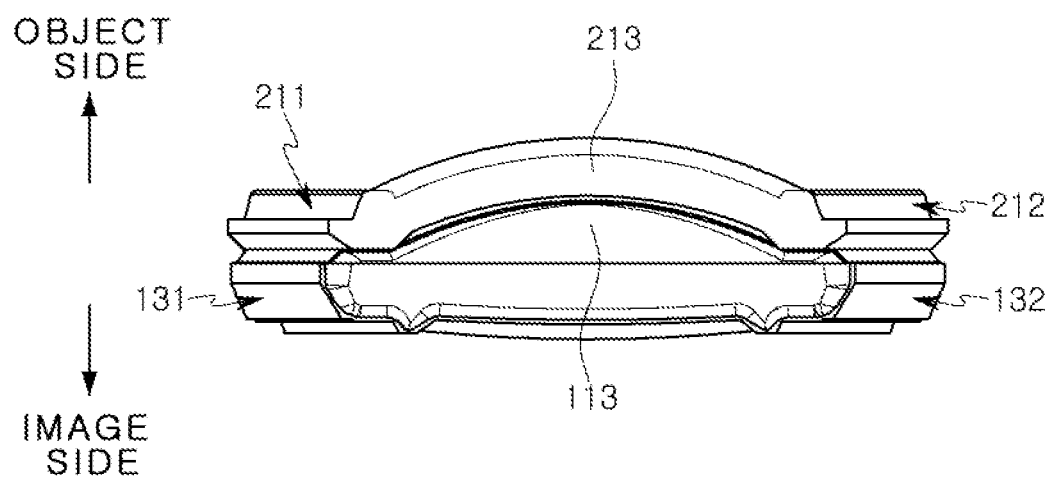
FIG. 6 is a side view of a lens and a blocking member according to an example.

Since the object-side surface OS of the optical portion 110 is convex, object sides of the third edge 113 and the fourth edge 114 of the optical portion 110 have an arc shape when viewed in a direction perpendicular to the optical axis direction (see FIG. 6).

Referring to FIG. 2, the flange portion 130 includes a first flange portion 131 and a second flange portion 132. The first flange portion 131 extends from the first edge 111 of the optical portion 110, and the second flange portion 132 extends from the second edge 112 of the optical portion 110.

The first edge 111 of the optical portion 110 may refer to a portion adjacent to the first flange portion 131, and the second edge 112 of the optical portion 110 may refer to a portion adjacent to the second flange portion 132.

The third edge 113 of the optical portion 110 may refer to one side of the optical portion 110, in which the flange portion 130 is not formed, and the fourth edge 114 of the optical portion 110 may refer to the other side of the optical portion 110, in which the flange portion 130 is not formed.

The lens 100 is formed of a plastic material, and is injection-molded through a mold. In this case, the lens 100 according to the example is not formed by cutting a portion of the lens after injection molding, but is formed to have the above-described shape during the injection molding.

Since the lens generally has a substantially circular shape and the image sensor of the camera module has a rectangular shape, light refracted by a circular lens is not all imaged on the image sensor.

Thus, unnecessary portions are removed from the optical portion of the lens to reduce the size of the lens, thereby reducing the size of the camera module.

For example, if a portion of the lens is removed after injection molding, the lens may be deformed by force applied to the lens during the removal process. In the case in which the lens is deformed, optical performance of the lens is inevitably changed.

However, in the case of the lens 100 according to the example of the present disclosure, since the optical portion 110 and the flange portion 130 of the lens 100 are formed to have a noncircular shape at the time of performing an injection process, the size of the lens 100 may be reduced, and performance of the lens 100 may also be secured.

Figure 3:
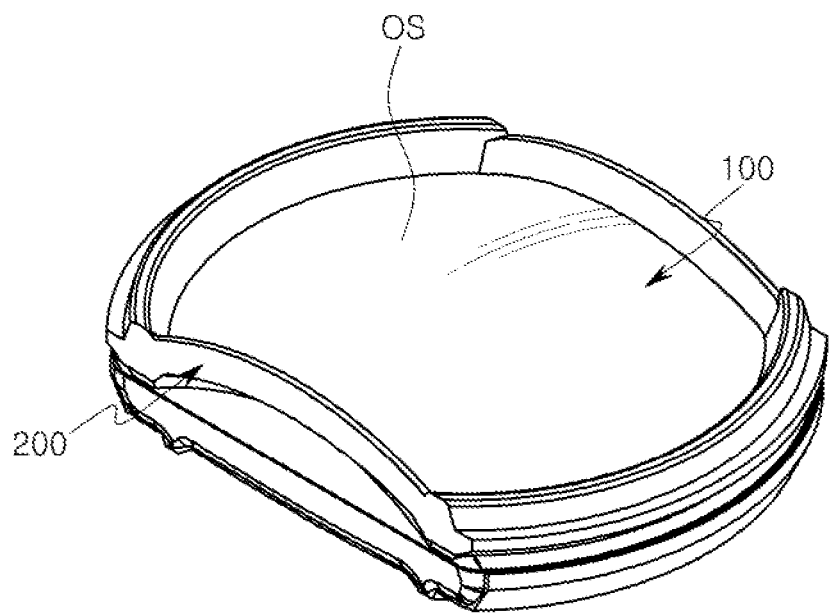
FIGS. 3 and 4 are perspective views of a lens and a blocking member according to an example.
Figure 4:
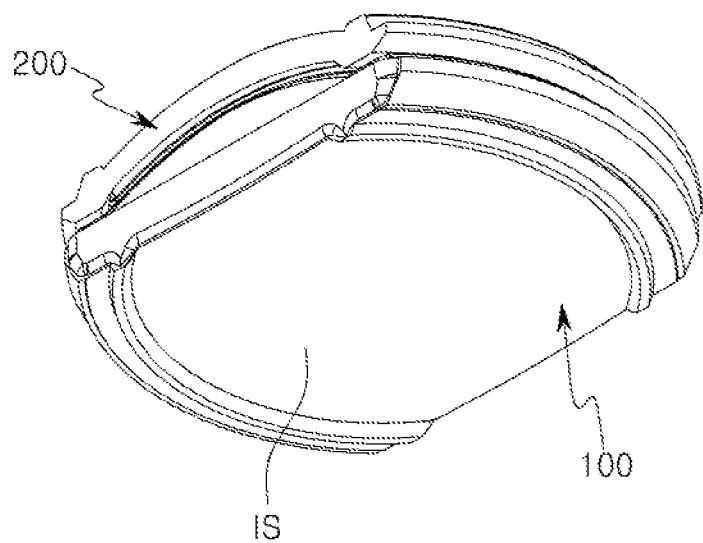
Figure 5:
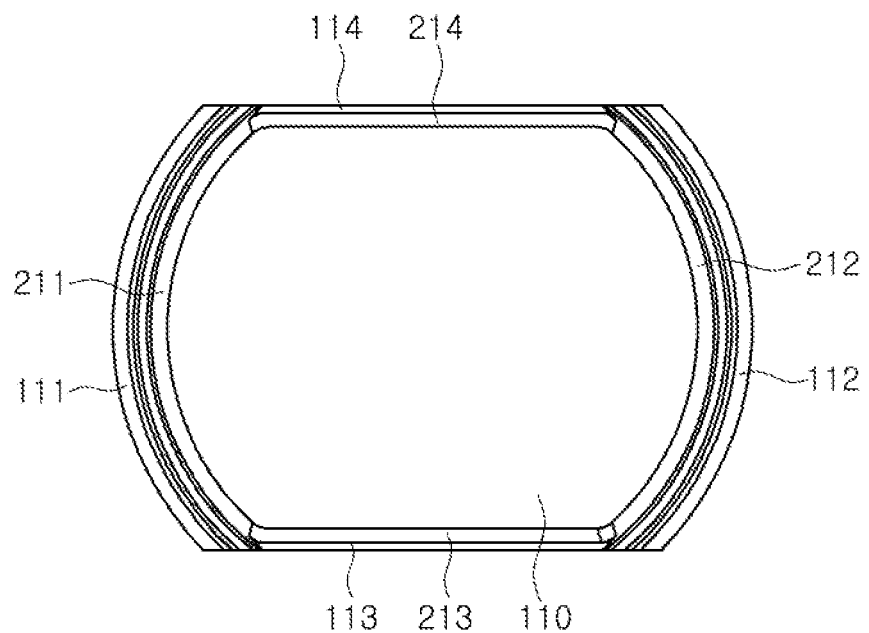
FIG. 5 is a plan view of a lens and a blocking member according to an example.

FIGS. 3 and 4 are perspective views of a lens and a blocking member according to an example, FIG. 5 is a plan view of a lens and a blocking member according to an example, and FIG. 6 is a side view of a lens and a blocking member according to an example.

Figure 7:
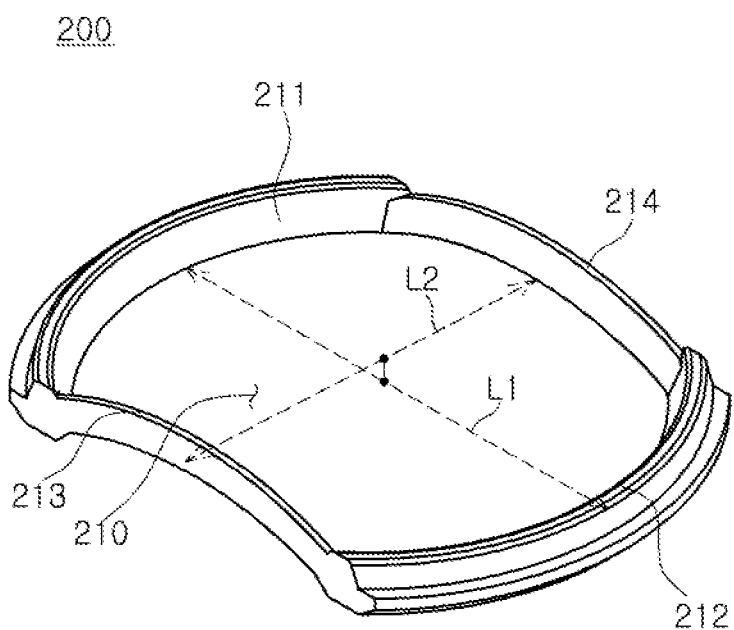
FIG. 7 is a perspective view of a blocking member according to an example.
Figure 8:
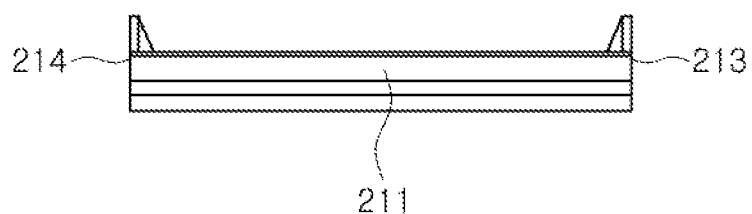
FIG. 8 is a first side view of a blocking member according to an example.
Figure 9:
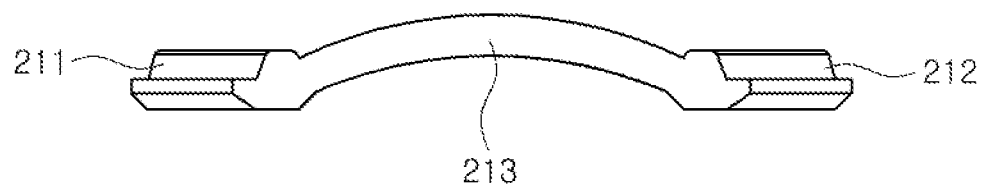
FIG. 9 is a second side view of a blocking member according to an example.

FIG. 7 is a perspective view of a blocking member according to an example, FIG. 8 is a first side view of a blocking member according to an example, and FIG. 9 is a second side view of a blocking member according to an example.

The blocking member 200 is disposed in front of the lens 100, for example, toward the object side, and is coupled to the lens barrel 300 and/or the lens 100.

The blocking member 200 may be provided separately from the lens barrel 300, or may be integrally formed with the lens barrel 300.

The blocking member 200 has a substantially quadrangular frame shape, and has an opening 210 disposed in a central portion thereof, such that light may be incident on the lens 100.

The blocking member 200 includes a first portion 211, a second portion 212, a third portion 213 and a fourth portion 214. The first portion 211 and the second portion 212 are disposed to oppose each other, and the third portion 213 and the fourth portion 214 are disposed to oppose each other. The third portion 213 and the fourth portion 214 respectively connect the first portion 211 and the second portion 212 to each other.

A space surrounded by the first to fourth portions 211 to 214 forms the opening 210. The opening 210 has a noncircular shape like the shape of the optical portion 110.

The blocking member 200 is in contact with the flange portion 130, and is not in contact with the optical portion 110.

The first portion 211 of the blocking member 200 is disposed in a position corresponding to the first flange portion 131 of the lens 100, and the second portion 212 of the blocking member 200 is disposed in a position corresponding to the second flange portion 132 of the lens 100.

The first portion 211 of the blocking member 200 contacts the first flange portion 131 of the lens 100, and the second portion 212 of the blocking member 200 contacts the second flange portion 132 of the lens 100.

The third portion 213 of the blocking member 200 is disposed in a position in which at least a portion thereof corresponds to the third edge 113 of the optical portion 110 of the lens 100, and the fourth portion 214 of the blocking member 200 is disposed in a position in which at least a portion thereof corresponds to the fourth edge 114 of the optical portion 110 of the lens 100.

The third portion 213 of the blocking member 200 is not in contact with the third edge 113 of the optical portion 110 of the lens 100, and the fourth portion 214 of the blocking member 200 is not in contact with the fourth edge 114 of the optical portion 110 of the lens 100. For example, the third portion 213 of the blocking member 200 may be spaced apart from the third edge 113 of the optical portion 110 of the lens 100, and the fourth portion 214 of the blocking member 200 may be spaced apart from the fourth edge 114 of the optical portion 110 of the lens 100.

In the present example, at least a portion of the third portion 213 of the blocking member 200 is disposed to cover the third edge 113 of the optical portion 110 of the lens 100 in the optical axis direction. At least a portion of the fourth portion 214 of the blocking member 200 is disposed to cover the fourth edge 114 of the optical portion 110 of the lens 100 in the optical axis direction.

At least a portion of the blocking member 200 facing the optical portion 110 in the optical axis direction includes an arc shape.

Since an object side of the third edge 113 of the optical portion 110 of the lens 100 has an arc shape, the third portion 213 of the blocking member 200 also has an arc shape. For example, an image side of the third portion 213 of the blocking member 200 has an arc shape corresponding to the object side of the third edge 113 of the optical portion 110. On the other hand, the object side of the third portion 213 of the blocking member 200 may also have an arc shape.

Since the object side of the fourth edge 114 of the optical portion 110 of the lens 100 has an arc shape, the fourth portion 214 of the blocking member 200 also has an arc shape. For example, the image side of the fourth portion 214 of the blocking member 200 has an arc shape corresponding to the object side of the fourth edge 114 of the optical portion 110. On the other hand, the object side of the fourth portion 214 of the blocking member 200 may also have an arc shape.

At least a portion of the blocking member 200, facing the optical portion 110 in the optical axis direction, is located to be higher than a portion of the blocking member 200, facing the flange portion 130 in the optical axis direction.

For example, boundaries between the third edge 113 and the fourth edge 114 of the optical portion 110 and the blocking member 200 are located to be higher than boundaries between the first edge 111 and the second edge 112 of the optical portion 110 and the blocking member 200, in the optical axis direction.

For example, when a virtual straight line L1 (hereinafter, referred to as a first straight line) connecting a lower surface of the first portion 211 and a lower surface of the second portion 212 at a shortest distance, while passing through an optical axis, is defined as the first straight line, and a virtual straight line L2 (hereinafter, referred to as a second straight line) connecting a lower surface of the third portion 213 and a lower surface of the fourth portion 214 at a shortest distance, while passing through the optical axis, is defined as the second straight line; the first straight line L1 and the second straight line L2 are located on different planes. For example, the second straight line L2 is positioned to be higher than the first straight line L1 in the optical axis direction (see FIG. 7).

For example, a position of the opening 210 formed in the third edge 113 and the fourth edge 114 of the optical portion 110 of the lens 100 is different from a position of the opening 210 formed in the first edge 111 and the second edge 112 of the optical portion 110 of the lens 100. In this case, the position refers to a position in the optical axis direction.

A boundary between the optical portion 110 and the flange portion 130 of the lens 100 is formed in substantially the same position in the optical axis direction along a circumference. The boundary between the optical portion 110 and the flange portion 130 is a boundary between the first edge 111 and the first flange portion 131, and/or between the second edge 112 and the second flange portion 132.

On the other hand, since an object side of the third edge 113 of the optical portion 110 and an object side of the fourth edge 114 thereof have an arc shape, positions thereof in the optical axis direction are not constant.

Thus, if a position of the opening 210 formed by the blocking member 200 is constant in the optical axis direction, since a space is inevitably formed between the optical portion 110 of the lens 100 and the blocking member 200, unnecessary light, stray light, is introduced into the space, which adversely affects an image quality.

However, in the case of the lens assembly according to examples in the present disclosure, since the position of the opening 210 formed by the blocking member 200 is formed to correspond to the arc shape of the optical portion 110 of the lens 100, unnecessary light may be prevented from entering the inside of the lens assembly.

On the other hand, the lens barrel 300 and the lens 100 are configured in such a manner that two surfaces thereof contact each other. For example, the first flange portion 131 and the second flange portion 132 of the lens 100 are configured to contact an inner surface of the lens barrel 300, and the optical portion 110 of the lens 100 is configured to not contact the inner surface of the lens barrel 300.

For example, the third edge 113 and the fourth edge 114 of the optical portion 110 of the lens 100 are disposed to be spaced apart from the inner surface of the lens barrel 300 in a direction perpendicular to the optical axis.

Thus, a predetermined space is formed between the third edge 113 of the optical portion 110 of the lens 100 and the lens barrel 300, and a predetermined space is also formed between the fourth edge 114 of the optical portion 110 of the lens 100 and the lens barrel 300.

Even in the case of formation of the space as described above, with the lens assembly according to the example of the present disclosure, unnecessary light may be prevented from entering the space between the optical part 110 of the lens 100 and the lens barrel 300, by the blocking member 200.

As described above in the examples, the lens assembly according to an example may reduce the size, while securing performance, of the lens assembly.

Figure 10:
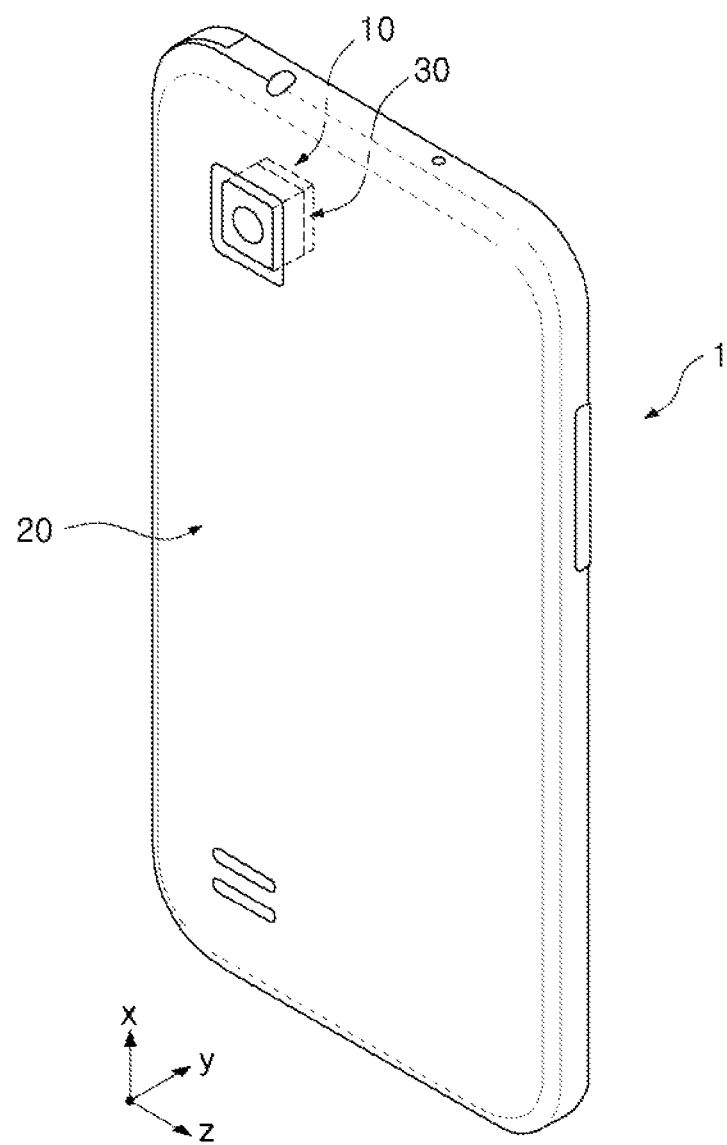
FIG. 10 is a perspective diagram illustrating a portable electronic device according to an example.

FIG. 10 is a perspective diagram illustrating a portable electronic device according to an example. The portable electronic device 1 may include a camera module 10. The camera module 10 may include the lens assembly illustrated in FIG. 1 including the lens 100, the blocking member 200, and the lens barrel 300, and an image sensor 30.

The portable electronic device 1, may further include a display unit 20, wherein the camera module 10 is installed as a front camera of the portable electronic device 10 along with the display unit 20 or as a back camera on a side of the portable electronic device 10 other than a side with the display unit 20. In an example, light incident through the lens 100 may impinge on the image sensor 30. An electrical signal converted by the image sensor 30 of the camera module 10 may be output as an image via the display unit 20 of the portable electronic device 10.

As set forth in the examples described herein, the size of the lens assembly may be reduced while securing the performance thereof, allowing the size of the portable electronic device to also be reduced.

While specific examples have been shown and described above, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A lens assembly comprising:
   a lens comprising an optical portion refracting light and a flange portion extending along a portion of a circumference of the optical portion;
   a blocking member disposed in front of the lens and comprising an opening to allow light to be incident on the lens; and
   a lens barrel accommodating the lens,
   wherein a length of the lens in a first direction perpendicular to an optical axis is longer than a length of the lens in a second direction perpendicular to the optical axis and the first direction, and
   wherein a portion of the blocking member, facing the optical portion in an optical axis direction, is located to be higher than a portion of the blocking member, facing the flange portion in the optical axis direction.

2. The lens assembly of claim 1, wherein the blocking member is in contact with the flange portion and is not in contact with the optical portion.

3. The lens assembly of claim 1, wherein the portion of the blocking member facing the optical portion in the optical axis direction, comprises an arc shape.

4. The lens assembly of claim 1, wherein the optical portion comprises a first edge and a second edge having an arc shape when viewed in the optical axis direction, and a third edge and a fourth edge, connecting the first edge and the second edge to each other.

5. The lens assembly of claim 4, wherein the flange portion extends from the first edge and the second edge.

6. The lens assembly of claim 4, wherein boundaries between the third and fourth edges and the blocking member are located to be higher than boundaries between the first and second edges and the blocking member, in the optical axis direction.

7. The lens assembly of claim 4, wherein object sides of the third edge and the fourth edge comprise an arc shape when viewed in a direction perpendicular to the optical axis.

8. The lens assembly of claim 7, wherein a surface of the blocking member, facing the third edge and the fourth edge in the optical axis direction, comprises an arc shape when viewed in the direction perpendicular to the optical axis.

9. The lens assembly of claim 1, wherein the blocking member comprises a first portion and a second portion opposing each other, and a third portion and a fourth portion opposing each other,
   wherein a space surrounded by the first portion to the fourth portion forms the opening, the first portion and the second portion are located in a position corresponding to the flange portion, and the third portion and the fourth portion are located in a position in which portions of the third and fourth portions correspond to the optical portion.

10. The lens assembly of claim 9, wherein a virtual straight line, connecting a lower surface of the first portion and a lower surface of the second portion to each other at a shortest distance, while passing through the optical axis, is located on a plane different from a plane on which a virtual straight line, connecting a lower surface of the third portion and a lower surface of the fourth portion to each other at a shortest distance, while passing through the optical axis, is located.

11. The lens assembly of claim 1, wherein an object-side surface of the optical portion is convex.

12. The lens assembly of claim 1, wherein a length of the opening in the first direction perpendicular to the optical axis is longer than a length of the opening in the second direction perpendicular to the optical axis and the first direction.

13. The lens assembly of claim 1, wherein the blocking member is coupled to the lens barrel.

14. A portable electronic device, comprising:
   the lens assembly of claim 1;
   an image sensor configured to convert light incident through the optical portion disposed in the lens barrel to an electrical signal; and a display unit disposed on a surface of the portable electronic device to display an image based on the electrical signal.

15. A blocking member for a lens assembly, comprising:
first opposing sides including a first side and a second side disposed to oppose each other to block incident light and comprising lower surfaces disposed in a first plane;
second opposing sides including a third side and a fourth side disposed to oppose each other to block incident light and comprising lower surfaces disposed above the first plane in an optical axis direction, the third side and the fourth side respectively connecting the first side and the second side to each other; and
an opening encompassed by the first side, the second side, the third side and the fourth side so as to be formed between the first and second opposing sides to pass incident light therethrough,
wherein a distance through a center of the opening between the first side and the second side is longer than a distance though the center of the opening between the third side and the fourth side.

16. The blocking member of claim 15, wherein the lower surfaces of the second opposing sides comprise an arc shape extending in a convex or concave direction along the optical axis direction.

17. A portable electronic device comprising:
the blocking member of claim 15;
a lens to refract the incident light and comprising a convex or concave portion and a planar portion of a side disposed facing the blocking member;
an image sensor configured to convert light incident through the lens to an electrical signal; and
a display unit disposed on a surface of the portable electronic device to display an image based on the electrical signal,
wherein the lower surfaces of the first opposing sides contact the planar portion and the lower surfaces of the second opposing sides are spaced apart from and follow the contour of the convex or concave portion.

* * * * *